(12) United States Patent
Vattay et al.

(10) Patent No.: US 11,168,036 B2
(45) Date of Patent: Nov. 9, 2021

(54) IRON (III) OXIDE CONTAINING SOIL-BINDING COMPOSITION

(71) Applicant: Invention Center Kft., Budapest (HU)

(72) Inventors: Antal Vattay, Budapest (HU); Rikárd Vattay, Budapest (HU); Katalin Andrea Posta, Gödöllö (HU); Péter Póti, Budapest (HU); Imre Varga, Budapest (HU); Gyula Záray, Budapest (HU); Miklós Lóczi, Jászapáti (HU); Gábor Miklós Szurop, Györújbarát (HU)

(73) Assignee: INVENTION CENTER KFT., Budapest (HU)

( * ) Notice: Subject to any disclaimer, the term of this patent is extended or adjusted under 35 U.S.C. 154(b) by 56 days.

(21) Appl. No.: 16/197,543

(22) Filed: Nov. 21, 2018

(65) Prior Publication Data

US 2019/0084897 A1  Mar. 21, 2019

Related U.S. Application Data

(62) Division of application No. 15/106,344, filed as application No. PCT/HU2014/000129 on Dec. 22, 2014, now abandoned.

(30) Foreign Application Priority Data

Dec. 23, 2013 (HU) .................................. P1300753

(51) Int. Cl.
 *C05G 3/80* (2020.01)
 *C05D 9/02* (2006.01)
 *C05G 3/70* (2020.01)
 *C09K 17/40* (2006.01)

(52) U.S. Cl.
 CPC .............. *C05G 3/80* (2020.02); *C05D 9/02* (2013.01); *C05G 3/70* (2020.02); *C09K 17/40* (2013.01)

(58) Field of Classification Search
 CPC .. C05G 3/80; C05G 3/70; C09K 17/40; C05D 9/02
 See application file for complete search history.

(56) References Cited

U.S. PATENT DOCUMENTS 3,294,523 A   12/1966  Morningstar
5,865,869 A    2/1999  Hansen
(Continued)

FOREIGN PATENT DOCUMENTS

| CN | 101366953 A | 2/2009 | |
|---|---|---|---|
| WO | 9805608 A2 | 2/1998 | |
| WO | 2004095924 A1 | 11/2004 | |
| WO | WO-2004095924 A1 * | 11/2004 | ............... C05G 3/80 |
| WO | 2010058425 A2 | 5/2010 | |

OTHER PUBLICATIONS

Amjad, Zahid and Zuhl, Robert. "Particle Size and Microscopic Investigation of Iron Oxide Foulants in the Presence of Dispersants". Lubrizol Sep. 2006.*

(Continued)

*Primary Examiner* — Jennifer A Smith
(74) *Attorney, Agent, or Firm* — Saliwanchik, Lloyd & Eisenschenk

(57) ABSTRACT

The invention relates to compositions for retaining soil moisture and improving plant growth in dry soils, which, together with one or more moisture retaining materials and wetting agents, comprises iron(III) oxides and optionally potassium metabisulfite [borken (HU), E224] as potentiating agent. The iron(III) oxides preferably are microparticulate. The composition Suitably comprises iron(III)oxides and potassium metabisulfite as potentiating agent. Other aspects of the invention relate to binding the moisture content of soils, as well as compositions for use in enhancing the efficacy of Soil retaining compositions.

4 Claims, 9 Drawing Sheets

(56) References Cited

U.S. PATENT DOCUMENTS

| | | | |
|---|---|---|---|
| 6,048,377 A | | 4/2000 | Kviesitis |
| 2005/0111924 A1 | | 5/2005 | Maile et al. |
| 2005/0289665 A1 | * | 12/2005 | Hartle .................. A01N 31/08 800/278 |
| 2008/0116141 A1 | | 5/2008 | Vempati et al. |
| 2009/0093551 A1 | | 4/2009 | Bhatia et al. |
| 2016/0318822 A1 | | 11/2016 | Vattay et al. |

OTHER PUBLICATIONS

Sigma-Aldrich. "Iron" <https://www.sigmaaldrich.com/materials-science/material-science-products.html?TablePage=19925814> Feb. 10, 2009 (Year: 2009).*

Zhang, Yang, et al. "Stability of commercial metal oxide nanoparticles in water." Water research 42.8-9 (2008): 2204-2212. (Year: 2008).*

Meng, Xiangpeng, et al. "Application of iron oxide as a pH-dependent indicator for improving the nutritional quality." Clinical nutrition research 5.3 (2016): 172. (Year: 2016).*

Saleh, Navid, et al. "Ionic strength and composition affect the mobility of surface-modified FeO nanoparticles in water-saturated sand columns." Environmental science & technology 42.9 (2008): 3349-3355. (Year: 2008).*

Gupta, Ajay Kumar, and Mona Gupta. "Synthesis and surface engineering of iron oxide nanoparticles for biomedical applications." biomaterials 26.18 (2005): 3995-4021. (Year: 2005).*

Johnson, Mary, "Detergents: Triton X-100, rween-20, and more." Mater Methods 3.1, 2013, 163.

Morello III, A Peter, et al., "Preparation and characterization of poly(methylmethacrylate)-iron (III) oxide microparticles using a modified solvent evaporation method." Journal of Microencapsulation, 2007, 24(5): 476-491.

* cited by examiner

IRON (III) OXIDE CONTAINING SOIL-BINDING COMPOSITION

CROSS REFERENCE TO RELATED APPLICATIONS

This application is a divisional of co-pending application Ser. No. 15/106,344, filed Jun. 20, 2016; which is a National Stage Application of International Application Number PCT/HU2014/000129, filed Dec. 22, 2014; which claims priority to Hungarian Application No. P1300753, filed Dec. 23, 2013; which are incorporated herein by reference in their entirety.

BACKGROUND OF THE INVENTION

The invention relates to compositions for retaining soil moisture and improving plant growth in dry soils, which, together with one or more moisture retaining materials (humectants) and wetting agents, comprises iron(III)oxides and optionally potassium metabisulfite [borkén (HU), E224] as potentiating agent. Further, the invention relates to binding the moisture content of soils, as well as composition for use in enhancing the efficacy of soil retaining compositions.

PRIOR ART

In plant metabolism, uptake of nutrient materials is of high importance, which, in turn, is basically influenced by the water content of soil. The nutrient transport of plants takes place predominantly through the roots, in which the water household plays a basic role. At the same time, the other important role of water is the cooling mechanism due to transpiration mainly through the leaves.

Due to the aforementioned, the basic criterion of the existence of plants is the access to water. The water content of soils is strongly varying in space and period, according to seasons on one hand, and geographical site on the other. As for growth of plant a continuous supply of water and nutrients is necessary, there was a strong need for methods which, as far as possible, provide avoidance of drying out of soils, and in case of minor amount of precipitation in case of drought, for binding thereof in a most possible extent, preventing the run-off, without inhibiting the flow into the lower layers.

For continuous maintenance of the plant growth not only the appropriate nutrient content, but also the sufficient functioning of the microorganism content of the soil is necessary, wherein the satisfactory life-function of microorganisms is also basically influenced by the water-content of soil.

A number of methods have been provided for inhibiting the decrease of soil moisture-content, one form of which is the introduction of the most different humectants in the soil. The common characteristic of these materials is that they easily bind the moisture while decrease the fast flow-out of the moisture from the area and the treated area, respectively. Such materials have a characteristic equilibrium point. Such materials are mainly organic compounds, such as glycols, polihydroxy alcohols, like glycerol and sorbitol.

U.S. Pat. No. 5,865,869 describes compositions in the form of liquid concentrated solution for improved water supply of plant roots, which essentially consist of an organic humectants, binding agent, wetting agent and water. As humectants, for example sorbitol, molasses, potassium lactate, sodium lactate, glycerol, potassium acetate, sodium acetate may be used. The composition may contain preferably a thickener, such as a cellulose ether derivative, hydroxyethyl cellulose, carboxymethyl propylcellulose and the like.

WO 90/13598 discloses a sprayable composition for covering, among others, soil, refuse at a dump site and other dangerous materials, which contains a water-soluble cellulose polymer forming a water-resisting layer after application, clay and a carrier, wherein the composition forms a tough, water-repellent and flexible layer, without penetrating in the soil. In the discussion of the composition of clay, the presence of iron oxide is mentioned.

U.S. Pat. No. 6,309,440 discloses compositions for stimulating plant growth, which are applicable of energy introduction. These compositions comprise carbon source, a water-soluble macronutrient component providing nitrogen and phosphorous, and vitamin/cofactor component, optionally together with a micronutrient component, which latter may contain zinc, iron and manganese source. As iron source, iron(II)oxide is mentioned.

US publication 2005/0111924 describes soil binding and revegetation compositions useful for inhibiting the erosion of soil, which comprises water, carbohydrate, protein, iron compound and a strong base, as well as a fibrous material comprising at least two different types of fibers; the pH-value of the compositions is strongly basic, characteristically 9 to 13, preferably 10 to 12.8. As iron com-pound, iron(ll) and iron(III)oxides and other iron salts are mentioned.

The above compositions contain binding materials, like lignosit, which is a hygroscopic adhesive and contains maize or potato dextrin, or alternatively, lignosulfonic acid calcium, sodium or ammonium salt may also be used. As wetting agent, compounds known per se are mentioned, such as Triton products (Triton 101, Triton X100, Ninol ll-CN, Igepal 60630, nonylphenol-(9-15)ethoxylate and the like.

The known methods, though have been generally used in the practice, resulted in the introduction of high amount of materials in the soil which are extraneous for the soil and plants and (may) lead not only to the modification of the plant metabolism, but also to transformation of the microorganism population, thus gradually altering the cultivation methods and processes. Therefore, there is a need for methods in which the introduction of extraneous materials may be reduced, and at the same time materials are used which are present in the soil in their natural form and at the same time synergize the already known soil moisture saving compositions, thus reducing the necessary amount thereof.

DETAILED DESCRIPTION OF THE INVENTION

It has been surprisingly found in course of experiments, that the efficiency, and at the same time the amount to be introduced of the compositions previously known may substantially be reduced, when before, during or subsequently to the application, iron oxide, in the form of $Fe^{3+}$-oxide is added to the soil.

Generally, soils contain iron in an amount of 1 to 5%, which is the fourth most occurring element in the Earth. Most part of the iron is present in silicate stones or as iron oxide or hydroxide, that is in forms which are hardly accessible for plants. In the soils the iron is present in $Fe^{++}$ and $Fe^{+++}$ form, wherein especially the latter can be very difficult to be utilized by the plant, though it is essential for these. Though the iron supply may be provided in traditional methods, by adding simple inorganic iron salts or complex iron compounds, this solution, however, needs frequent treatments as most of the materials used become lost, partly by being washed into and depositing in the deep layers of soil, and partly by taken up fast, mostly in an amount higher than required by the plant. It is especially important in case of dry soils.

The iron deficiency of plants is difficult to correct as the iron present in the different nutrients (fertilizers) transform rapidly into a form unavailable for the plants in the soil. In certain cases, some iron chelates proved to be useful, but very few chelates remain stable in a relatively broad pH range. At the same time, in the first line in case of dry soils, a small change in the moisture content results in a substantial change of pH value; thus, such methods are difficult to use.

Surprisingly, it has been found that by adding microparticle iron-oxide to dry soils, the plants, even in the dry soil exhibit substantial development. Namely, when sufficient amount of immobilized iron is present in the environment of the root, the plants are able to regulate their iron uptake. One possibility thereof is the material selection by the root hairs, such as production of mugeinic acid, or citric acid production, which make possible the mobilization of iron from the insoluble compounds present in the soil. Another possible utilization is the proton release by the root.

A further advantage of the new solution according to the invention is the influence of the siderophore production by the plants and the microorganisms present in the soil in an indirect way, thus providing a more steady iron uptake for the plants.

The addition of microparticle iron(III)oxide also influences the soil bacterium activity in a preferable effect as not only the plants, but also the microorganisms utilize from the same source (pool). Increase of the microbiological activity provides additional benefit at the same time, as the mobility of other nutrient elements (such as phosphorous, nitrogen) is also increases thereby.

Therefore, the subject of the invention is a method for improving the growth and development of plants living or being cultivated in dry soils, wherein on the locus of the plants or in the and/or to the roots of plants microparticle iron oxide is applied and administered, respectively. Another subject of the invention is a plant growth regulating composition, which, as essential component, comprises microparticle iron(III)oxide. According to an especially preferred embodiment of the invention, a composition for binding and retaining the humidity of dry soils is provided, which, besides known moisture retaining and humidity retaining compositions, further comprise iron(III)oxide.

A further subject of the invention is the improvement of the compositions comprising the iron(III)oxide and the methods applying the same as mentioned above, wherein as effect improving agent, potassium metabisulfite is used.

BEST MODE OF CARRYING OUT THE INVENTION

Figure 1:
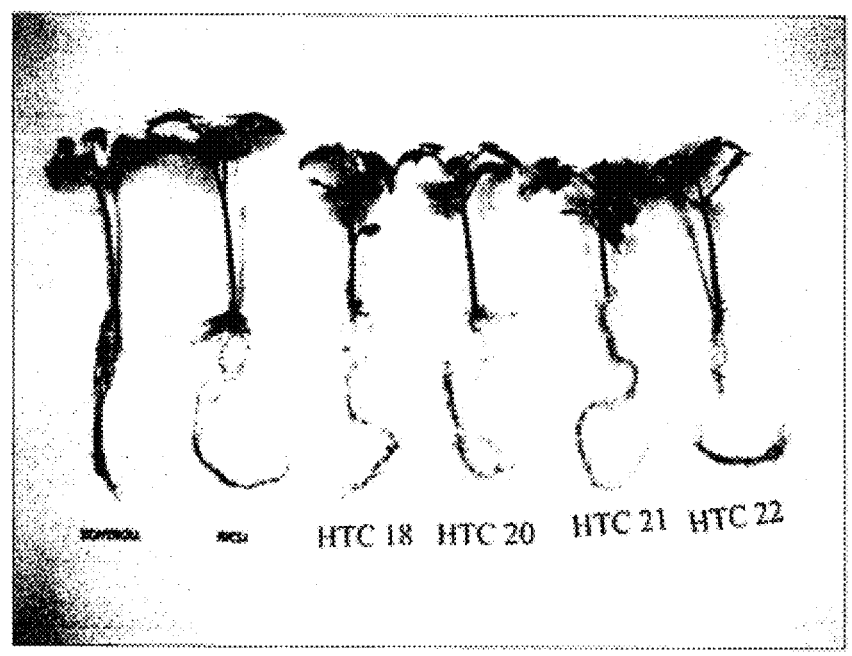
FIG. 1 is the view of plants obtained with tomato plants in withering-treatment tests.

In the process according to the invention the iron(III) oxide may be applied as such or formulated in an appropriate form. Considering that the iron supply can be of need in the first line on dry soils, and not only for the iron supply but also in respect of the moisture retaining, such formulations may suitably comprise the known components of compositions used for binding and retaining of humidity.

The composition of the invention comprises known moisture binding agent, known wetting agent, iron(III)oxide, optionally potassium metabisulfite and water.

A number of agents useful as moisture retaining agent are known. Special property of these materials is that they keep steady moisture content in air in contact with the saturated solution thereof. At a certain temperature, the solution releases moisture in the air, wherein the relative moisture content is below the characteristic equilibrium point of the said material. Thus, as moisture retaining material, such materials are called which, at a specified moisture content easily absorbs moisture, thus decreasing the degree of moisture emission of the material treated.

Such moisture retaining materials or mixtures thereof have specific moisture index. Certain organic materials, for example some glycols and polyalcohols, such as glycerol and sorbitol, show similar moisture retaining effect and moisture equilibrium index. Consequently, their solutions inhibit the evaporation in the air and the moisture from the air at a relative humidity beyond their equilibrium point.

Among the moisture retaining materials preferred are for example the sorbitol, molasses, potassium lactate, sodium lactate, glycerol, potassium acetate, sodium acetate, vegetable fats, oligofructose, carmellose syrup, magnesium carbonate, cocoa fibre and the like. Preferably applicable is the sorbitol.

The composition according to the invention comprises 10 to 80 weight % moisture binding agent, 0.5 to 5 weight % wetting agent, 0.1 to 0.5 weight % iron(III)oxide, 0 to 0.5 weight % potassium metabisulfite and about 20 to 85 weight % water. It is especially preferred when the composition, besides the iron(III)oxide, contains potassium metabisulfite as well.

Our experiments has shown that the composition according to the invention have excellent soil moisture retaining effect, even in loose structure soils.

The preferred composition according to the invention comprises 10 to 50 weight % molasses, about 0.5 weight % calcium lactate, 5 to 30 weight % sorbitol, 0.5 to 5 weight % Tween 20, 0.1 to 0.5 weight % iron(III)oxide and 0.005 to 0.5 weight % potassium metabisulfite.

In the composition, the iron(III)oxide is present in the form of $Fe_2O_3$ and $Fe_3O_4$ or the mixture thereof. The iron oxide is in miocroparticle form, wherein the particle size is suitably at most 50 micrometer, preferably 20 to 40 micrometer.

The compositions of the invention, in accordance with the ratios as specified above, are suitable in the form of concentrates. Obviously, during application, dilution is necessary, which cannot cause any problem for one skilled in the application technology. For use in small area, the dilution is suitably 10 to 1000-fold, suitably 50 to 150-fold.

In the process according to the invention the composition is applied on the locus in the form of concentrate or dilute solution/suspension, before or after planting, pre-emergently or post-emergently. In post-emergent use, the composition is preferably applied on the ground in a way that it does not contact with the plant parts above ground. Application may also be accomplished by dressing the propagation material, wherein the propagation material is coated in methods known per se with the concentrate, followed by drying. Dressing methods are well-known from the art.

The compositions of the invention substantially improve the water retaining ability of the soil while enhance the drought resistance of the plants as well and enhance the yield on dry soils. These effects have been shown both in greenhouse and open-air experiments. It has further been observed that—contrary to many plant protection and plant-retaining compositions—the compositions according to the invention have not influenced the germination ability of the seeds.

BEST MODE OF CARRYING OUT THE INVENTION

The results obtained with the compositions and the treatments according to the invention are illustrated in the following examples. As reference material, composition assembled according to U.S. Pat. No. 5,865,869 was used, while the compositions according to the invention ware different variants supplemented with different amounts of iron(III)oxide and optionally with potassium metabisulfite.

Example 1: Compositions Used in the Comparative Tests

The compositions are specified in Table I. The amounts of materials pressed in weight % calculated from the total weight of the compositions.

| material | HTC7* | HTC22 | HTZC30 |
| --- | --- | --- | --- |
| molasses | 25 | 25 | 25 |
| Ca-lactate | 2 | 2 | 2 |
| sorbitol | 18 | 18 | 18 |
| Tween 20 | 2 | 2 | 2 |
| iron(III)oxide | 0 | 0.5 | 0.5 |
| potassium metabisulfite | 0 | 0 | 0.05 |
| water | 53 | 52.5 | 52.45 |

*7 comparative composition, assembled according to U.S. Pat. No. 5,865,869

Example 2: Withering-Test on Tomato and Maize Seedlings

In a 200 ml vessel, tomato seeds were germinated in usual way and the seedlings were watered with a 60× dilution (59 ml water+1 ml concentrate) of the compositions by using 15 ml for watering. The control vessels were watered with 15 ml water.

The tomato seedlings were watered for one month with reduced amount of water, only enough for avoiding total withering with a total of 70 ml water per vessel, while the normal water claim of the plants would have been 370 ml during the period. In 2 weeks from the treatment the plants started to wither, the control plant perished after 15 days, while the sample treated with HTC7 and HTC22 started to present withering symptoms only after 21 days, which could be reversed with minimal watering (5 ml). In case of the control plants, the process was irreversible. The plants of tests are shown in FIG. 1. It can unanimously be seen that both HTC7 (labeled as "Ricsi" on the Figure) and HTC22 provided much better grown plants; in case of HTC22, the root is longer and more hairy than in case of HTC7.

In a 200 ml vessel, maize seedlings were planted and at planting, the seedlings were watered with a 60× dilution (59 ml water+1 ml concentrate) of the compositions by using 15 ml for watering. The control vessels were watered with 15 ml water.

Figure 2:
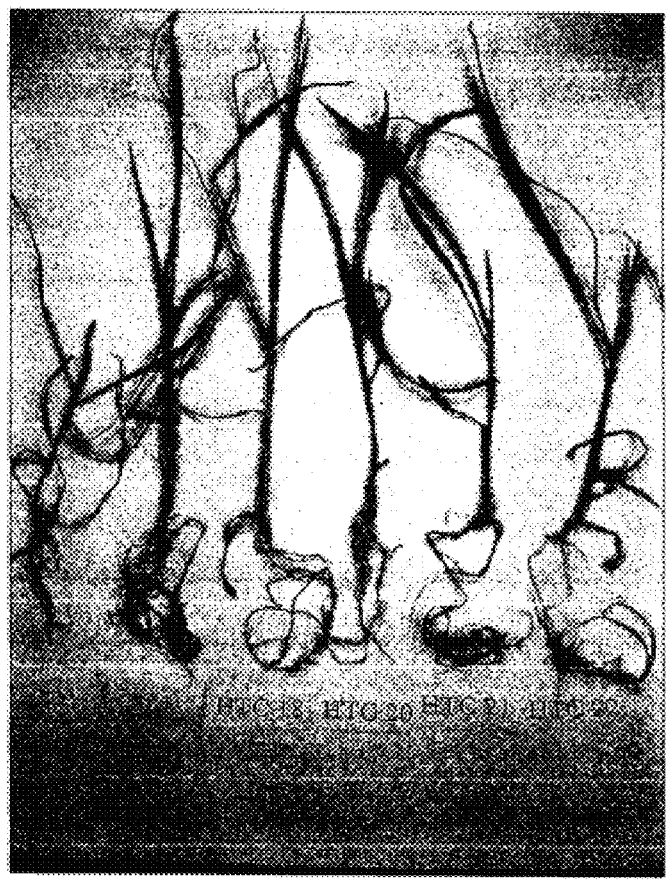
FIG. 2 is the view of plants obtained with maize plants in withering-treatment tests.

The plants were watered for one month+10 days with reduced amount of water, only enough for avoiding total withering with a total of 40 ml water per vessel, while the normal water claim of the plants would have been 290 ml during the period. In 3 weeks from the treatment the plants started to wither, in case of the control plants as well. The HTC7 started to present withering symptoms after one month, the HTC22 as last, started to present withering symptoms only after one month and 10 days. The plants of tests are shown in FIG. 2. It can unanimously be seen that compared to the control, both HTC7 (labeled as "Ricsi" on the Figure) and HTC22 provided much more developed plants; in case of HTC22, the root is longer and more hairy than in case of HTC7.

Example 3: Examination of Water-Retaining Ability of Soil

Figure 3:
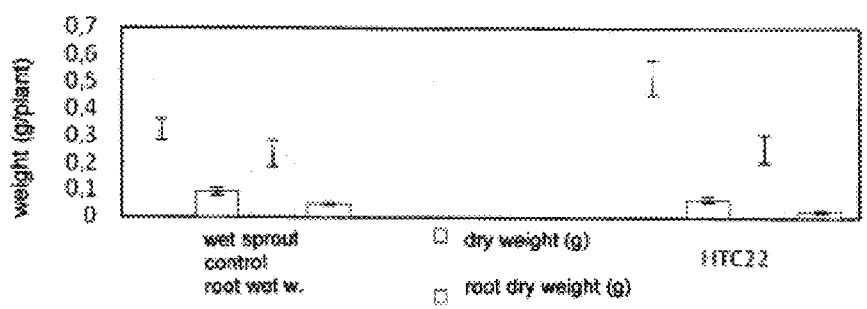
FIG. 3 shows the effect exerted on maize sprouts and root in tests for soil moisture retaining effect.

The soil was treated at the plantation of the maize seedling (from the mixture of 59 ml water+1 ml solution 15 ml to a 200 ml vessel; the control was watered with 15 ml water). The maize plants were grown in greenhouse for 6 weeks while receiving water according to needs, a total of 290 ml water during the 6 weeks period, both the control and treated plants. FIG. 3 shows the results obtained with five parallel trials.

After six weeks, the plants were removed from the plantation medium and the plantation media, equal volume of 200 ml each were dried until permanent weight. Illustrating the difference between the wet and dry weight it could be stated that the water-retaining ability of the treated soil is better, even in the situation that the higher plant weight results in higher evaporation. At the same time, the natural evaporation and effluent loss were reduced by the treatment. The results obtained in the test are shown on FIG. 4.

Figure 4:
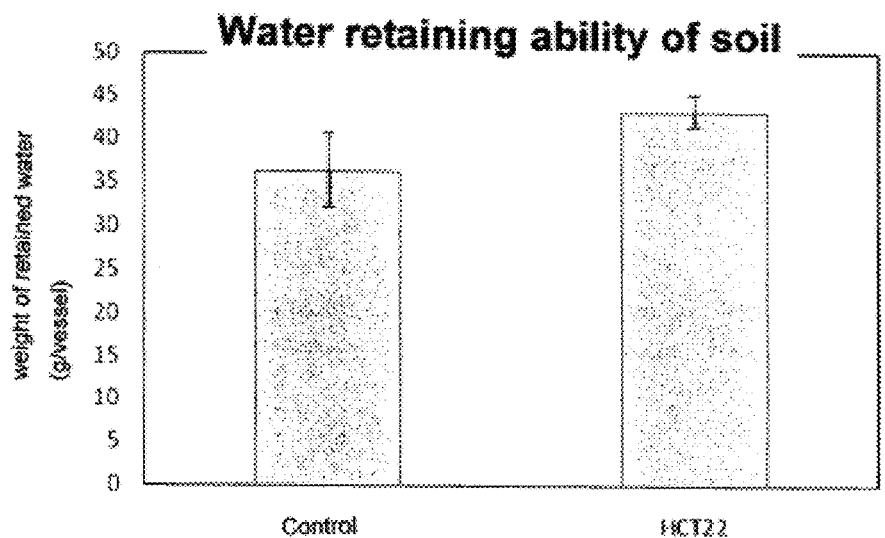
FIG. 4 is the diagram of water-retaining capacity of soil in tests for soil moisture retaining effect.

It can be seen from FIG. 4 that the soil treated with the composition was able to retain significantly more water compared to the control, and at the same time water supply was much more balanced, which is shown by the smaller standard deviation values.

Figure 5:
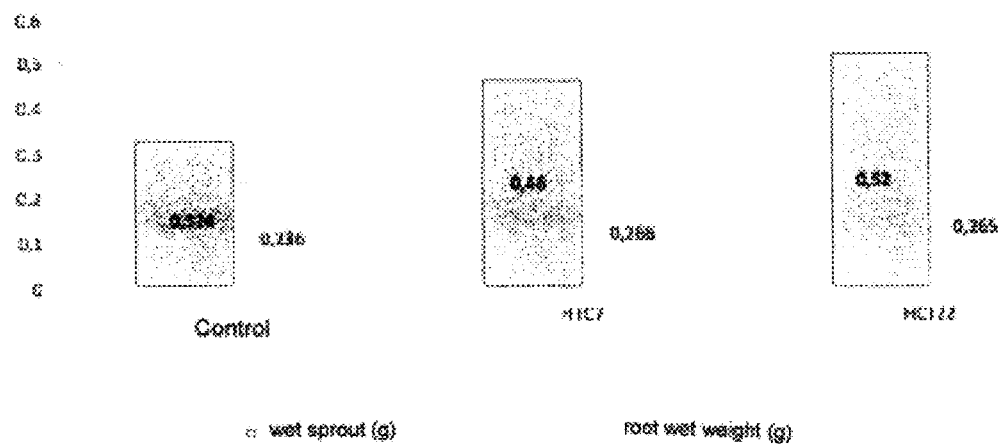
FIG. 5 is the diagram of wet sprout and wet root weights in comparative tests for soil moisture retaining effect.
Figure 6:
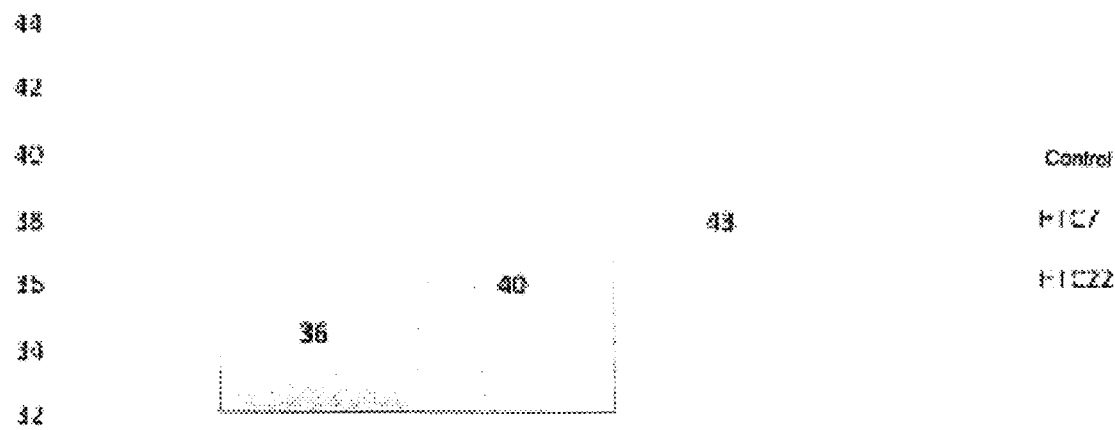
FIG. 6 shows the weight of water retained in the soil in comparative tests for soil moisture retaining effect.
Figure 7:
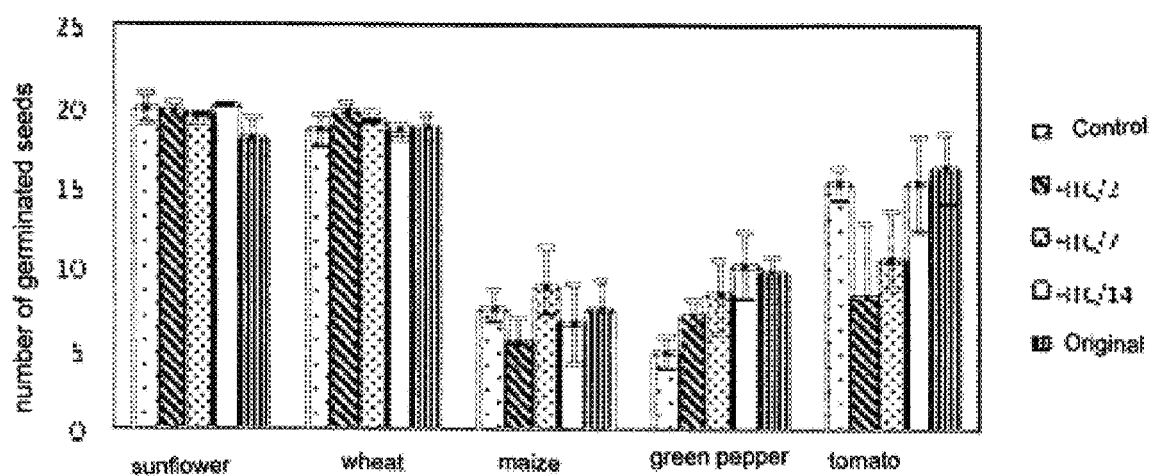
FIG. 7 shows the results of germination-inhibiting tests performed on filter-paper with maize.

The above test was also carried out by examining the HTC7 and HTC22 compositions beside the control. The test results are shown on FIGS. 5 and 6. It has been observed that both the wet sprout weights and wet root weights of the plants were substantially higher than in case of the control (see FIG. 5, the term "USA" means the HTC7 composition); HTC22 shows better result at the wet sprout weight than the HTC7 treatment. In FIG. 7 it can be seen that the soil moisture retaining ability was significantly increased by the HTC22 composition compared to both the control and the HTC composition (labeled as "USA" on the FIG.

Example 4: Effect of Treatment on the Germination Ability

The germination-inhibiting side-effect was tested on 5 plants, in two media in 5 parallels. Soil was filled in Petri-dishes or instead of soil, filter papers were used; on the surface thereof 20-22 seeds were placed. To the Petri-dishes provided with the filter papers each 10 ml of the 60× dilution were poured, the control was 10 ml water. The soil was watered with the mixture of 20 ml solution and 20 ml water; as control, 40 ml water was used.

It was established from the tests that the compositions according to the invention have not inhibited the germination of green pepper, tomato, maize, sunflower and wheat; even more, the germination of maize and green pepper have been stimulated. The results were of similar character both on wet paper filter and in soil.

Figure 8:
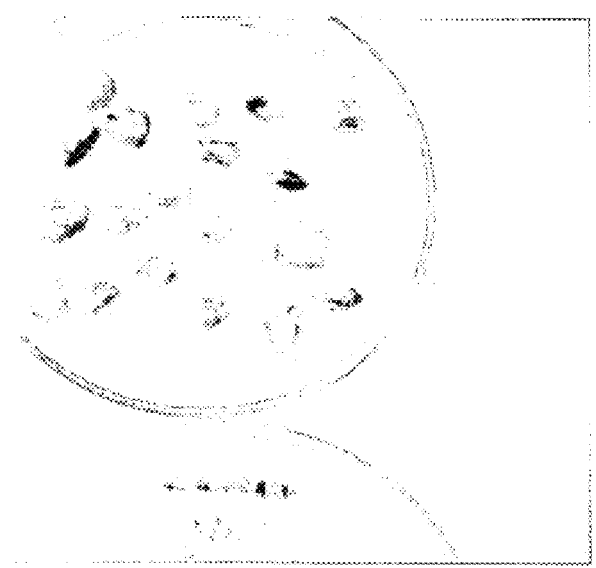
FIG. 8 is the view of germination of maize seeds during the germination-inhibiting tests.
Figure 9:
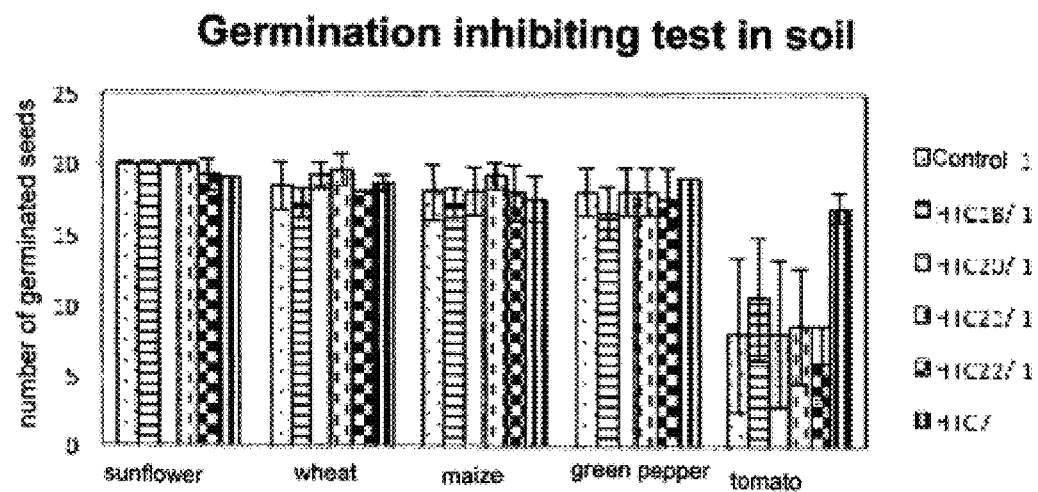
FIG. 9 shows the results of germination-inhibition tests carried out on filter-paper with wheat.
Figure 10:
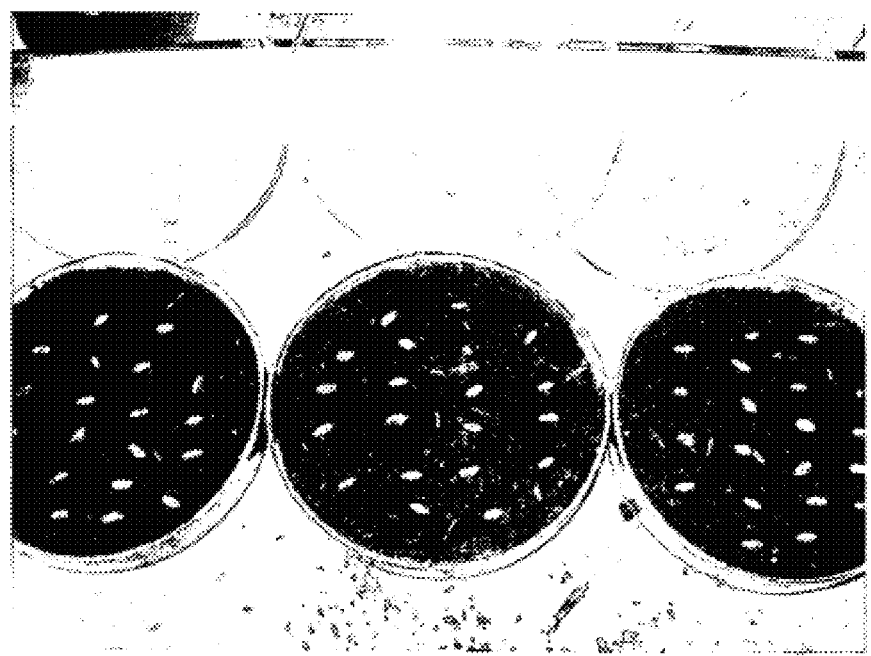
FIG. 10 is the view of wheat seeds during germination-inhibiting tests.

The test results obtained with maize are shown on FIGS. 7 and 8, those with wheat are shown on FIGS. 9 and 10.

Example 5: Test for Drought Resistance of the Compositions on Radish Plants

Figure 11:
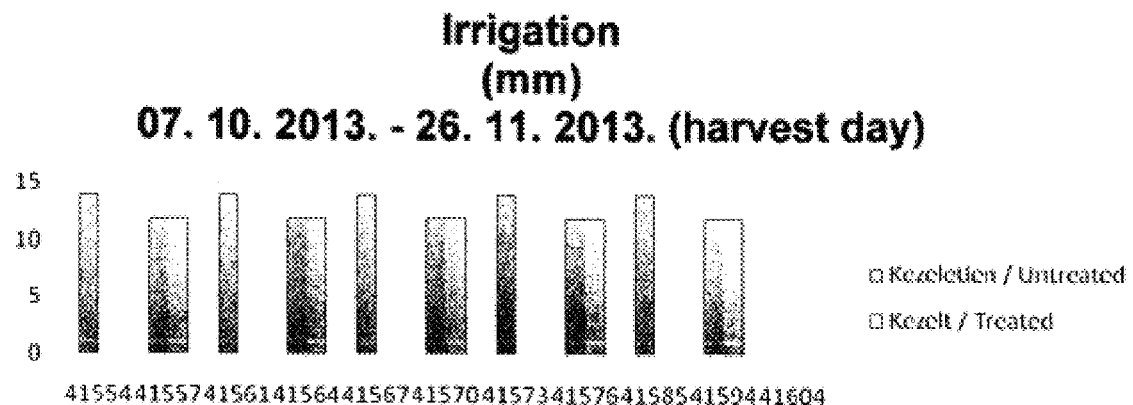
FIG. 11 is the protocol of radish drought resistance ability tests.
Figure 12:
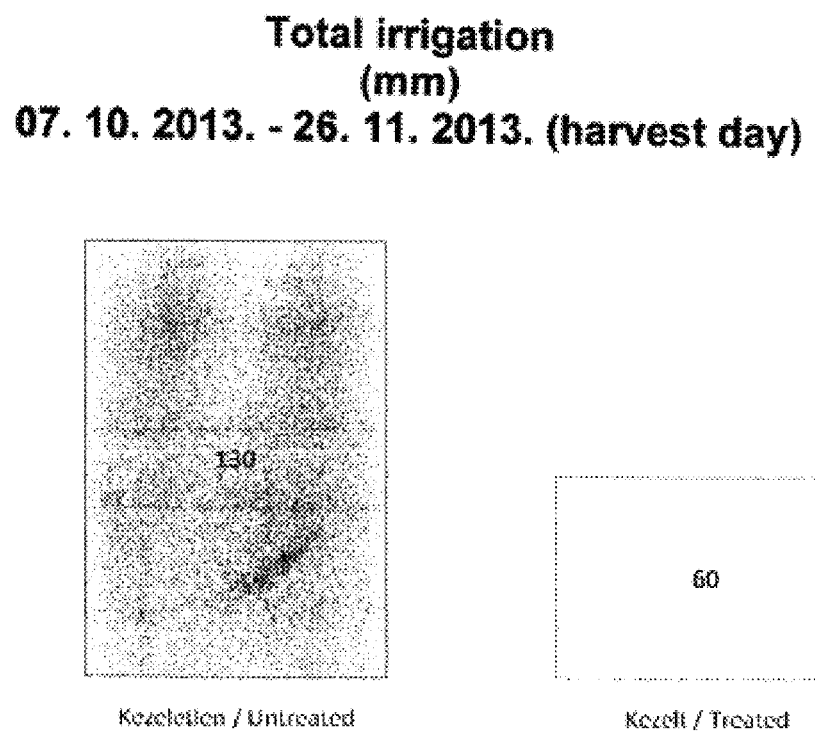
FIG. 12 shows the total watering in the radish drought resistance ability tests.

Radish seeds were planted and afterwards, but still before emerging the composition HTC30 was spayed on the soil surface in a 100× dilution, corresponding to a dose of 10 l/ha. Subsequently, watering was performed on the control area with an amount of water according to the need of the plant while the treated area received only 46% watering calculated to the control. The test protocol is shown on FIG. 11, while the total watering is shown on FIG. 12.

Figure 13:
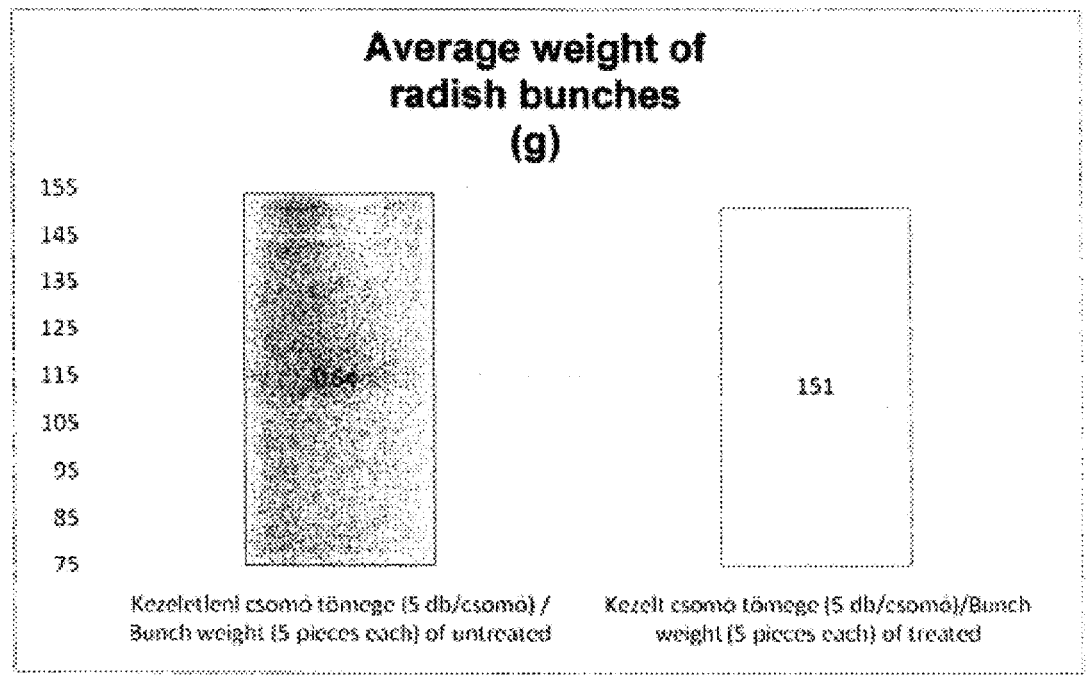
FIG. 13 is the summary of the mean radish bunch weights in the radish drought resistance ability tests.
Figure 14:
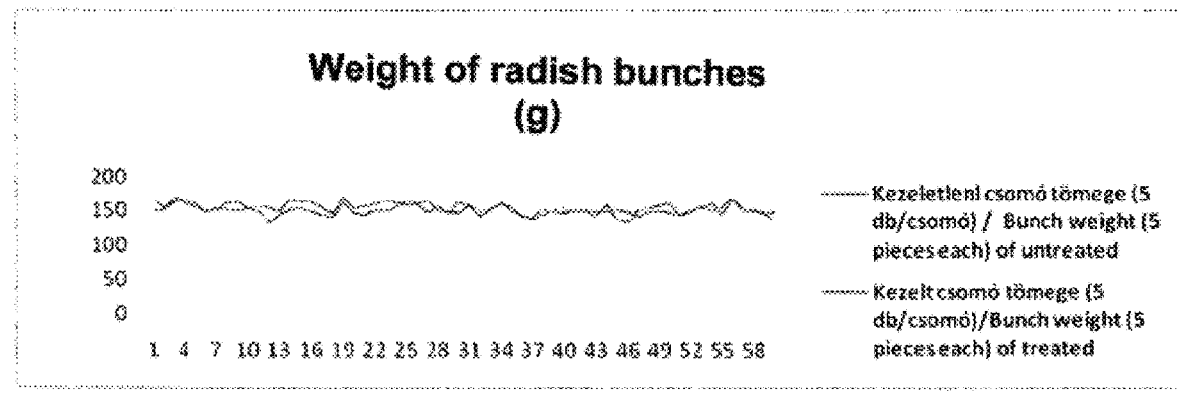
FIG. 14 is the summary of the individual radish bunch weights in the radish drought resistance ability tests.

After termination of the test, the weights and sizes of the radish bunches were evaluated. The mean radish bunch weights and the individual radish bunch weights (a total of 59 bunches) are shown in FIGS. 13 and 14, respectively. It can be seen from the Figures that the weight of the treated radish was 98.5% of the control plants.

Figure 15:
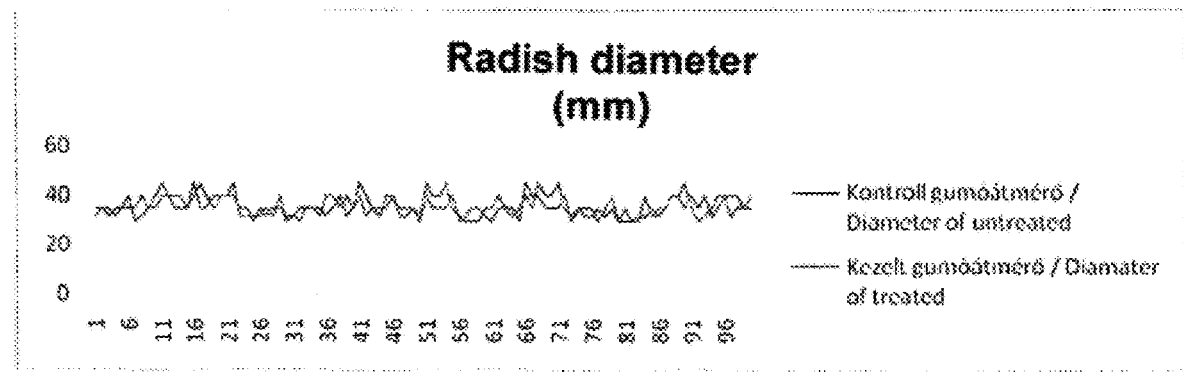
FIG. 15 is the summary of the individual radish plant weights in the radish drought resistance ability tests.
Figure 16:
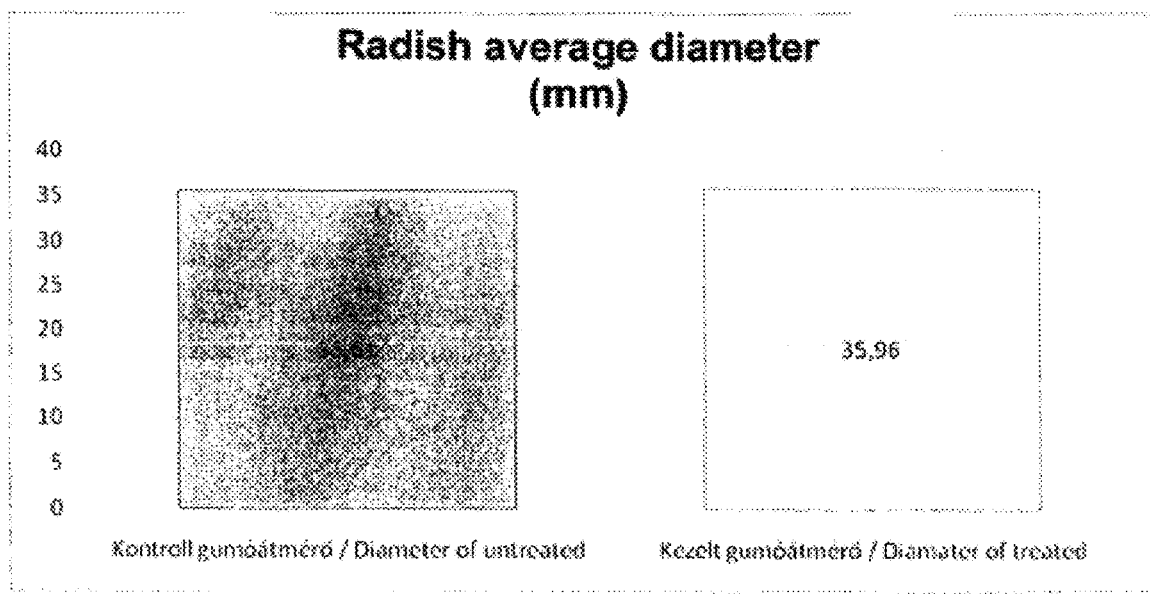
FIG. 16 is the summary of the mean radish plant weights in the radish drought resistance ability tests.

Following harvesting, the diameter and mean diameter of the radishes were measured; the results are shown on FIGS. 15 and 16. It was established that the diameter of the radishes harvester from the treated area were bigger by 0.5% than in case of the control plants.

It was established that from the treated area, essentially equal amount of harvest was collected by applying 54% less watering.

Example 6

Testing of the effect of the soil conditioning compositions on the soil-plant system was carried out on bean plants. For the tests, sterilizes substrate was used so that the *Rhizobium* strains responsible for the root nodules of bean have not been present.

Surface-sterilized bean seeds (*Phaseolus vulgaris* var. Rocco) were germinated at a temperature of 20±3° C. for 3 days. Thereafter a total of 60, 10 for each treatment, germ plants were planted into each 250 cm$^3$ sandy soil. The moisture contents were adjusted to 50% with sterile tap water, without additives (control), and with 1:60 dilutions of the soil conditioning composition prepared with sterile tap water, respectively.

The plants prepared as above were grown in climate chamber under 12/12 hours light period and 22/15° C. temperature. During treatment, 50% of the water supply necessary for the optimal development of the plant was provided. For defense against pests, fly trap containing sex pheromone was placed to the vicinity of the plants. No weed control was necessary during the tests.

Figure 17:
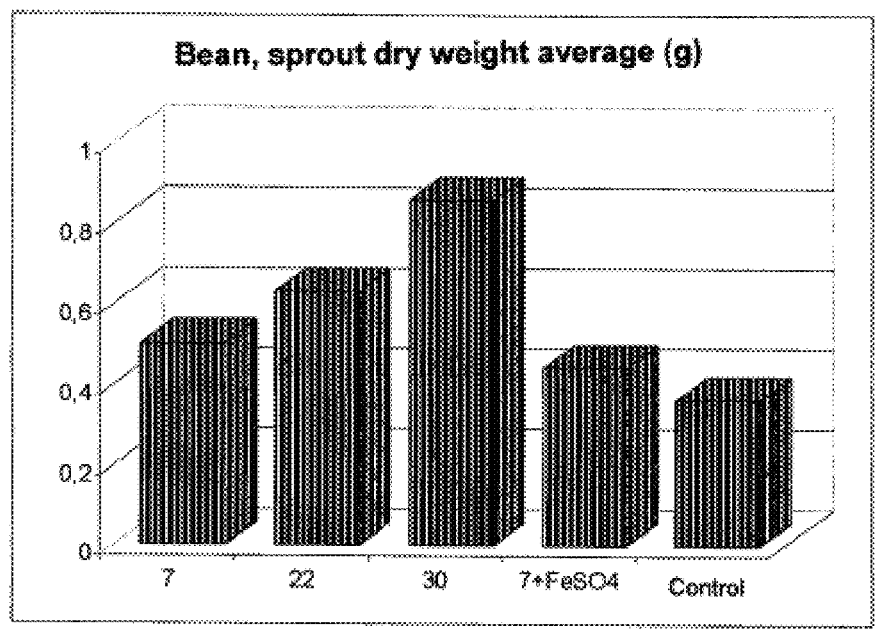
FIG. 17 shows the effect of iron(III)oxide, iron(III)oxide+ potassium metabisulfite and $FeSO_4$ additives on bean plants.

After the incubation period, the growth parameters (sprout length, root length) and the dry weight of the sprout and root were measured. From these data, the mean results relating to the sprout weight according to each treatment are shown in FIG. 17. The components of the test materials are shown in Table 1.

Evaluation of the test results have shown that, in comparison with the control, significant weight gain was observed on the effect of composition No. 7, which was, however, exceeded by the weight gain measured with the treatment with composition No. 22, containing iron(III) oxide. The result obtained by the treatment with the composition No. 30 was in relation to the control, but also substantially higher than obtained on the bean plants treated with the compositions No. 7 and 22. The weight gain obtained with composition No. 7 supplemented with the iron(II)-sulfate was far less than those obtained with the compositions No. 22 and 30 containing the identical amount of iron.

We claim:

1. A method for retaining soil moisture and/or improving plant growth, wherein the method comprises applying to soil or to a plant a composition comprising:

| | |
|---|---|
| Molasses | 10 to 50 weight % |
| Calcium lactate | 0.5 to 5 weight % |
| Sorbitol | 5 to 30 weight % |
| Tween 20 | 0.5 to 5 weight % |
| $Fe_2O_3/Fe_3O_4$ | 0.1 to 0.5 weight % |
| Potassium metabisulfite | 0 to 0.5 weight % |
| Water | 19.5 to 84 weight % | wherein the $Fe_2O_3$ is in the form of microparticles 50 micrometers or less in size.

2. The method of claim 1, wherein the composition is applied to soil before planting a plant therein.

3. The method of claim 1, wherein the composition is applied to soil after planting a plant therein.

4. The method of claim 1, wherein the composition is applied to propagation material of a plant.

* * * * *

UNITED STATES PATENT AND TRADEMARK OFFICE
CERTIFICATE OF CORRECTION

Page 1 of 1

PATENT NO. : 11,168,036 B2
APPLICATION NO. : 16/197543
DATED : November 9, 2021
INVENTOR(S) : Antal Vattay et al.

It is certified that error appears in the above-identified patent and that said Letters Patent is hereby corrected as shown below:

In the Specification

Column 7,
Line 13, "on the FIG." should read -- on the Fig). --.

In the Claims

Column 8,
Line 48, "Tween 20    0.5 to 5 weight %" should read -- Polysorbate 20    0.5 to 5 weight % --.
Line 49, "$Fe_2O_3/ Fe_3O_4$  0.1 to 0.5 weight %" should read -- $Fe_2O_3$    0.1 to 0.5 weight % --.

Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*